C. M. COWARDIN.
Saw-Teeth Dresser.
No. 129,461.                             Patented July 16, 1872.
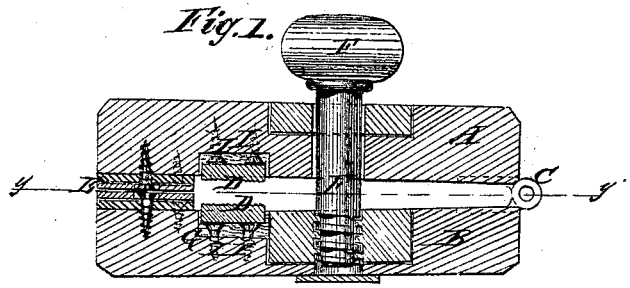
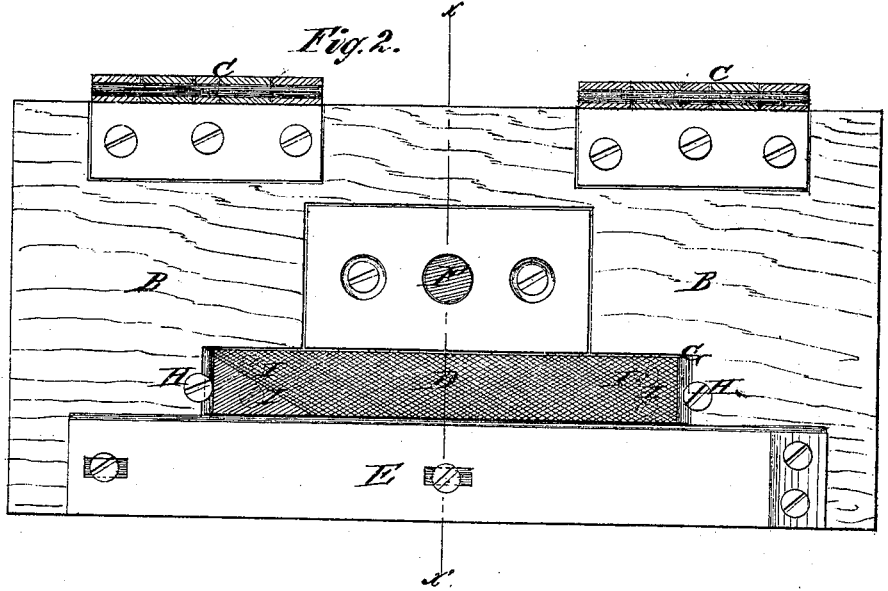
Witnesses:
P. C. Dieterich
H. A. Graham
Inventor:
C. M. Cowardin
per Munn
Attorneys.

UNITED STATES PATENT OFFICE.

COLLIN M. COWARDIN, OF GARDNER, TENNESSEE.

IMPROVEMENT IN SAW-TEETH DRESSERS.

Specification forming part of Letters Patent No. 129,461, dated July 16, 1872.

Specification describing a new and Improved Saw-Teeth Dresser, invented by COLLIN M. COWARDIN, of Gardner, in the county of Weakly and State of Tennessee.

My invention consists of a pair of blocks of wood hinged together, and each provided with a spring plate and a file in the side fronting the other, the spring being next to the edge, and the file between the spring and the hinge-joint, and behind the files, is a screw for screwing the blocks together. The files are fitted in a recess in the side of the block, with the upper surface a little above the block, and they have adjusting-screws by which to set them out more or less.

This dresser is for dressing off the outer corners of the teeth after the saw has been set to equalize the width of the set throughout, and is applied by introducing the blade between the said blocks, with the teeth between the files and the spring behind the teeth to act on the blade, and is then moved along from end to end, filing off all the points of the teeth alike. The springs are used to hold the apparatus on the blade by friction, and expanding or contracting with the variations of the thickness of the saw-blade as the dresser is moved along the saw.

Figure 1 is a transverse section of my improved dresser taken on the line $x\ x$ of Fig. 2, and Fig. 2 is a horizontal section taken on the line $y\ y$ of Fig. 1.

Similar letters of reference indicate corresponding parts.

A and B are the blocks, which are hinged together at C. D represents the files; E, the spring-plates; and F, the screw for holding the files against the saw. Said screw passes through one block and screws into the other. The files are let into the blocks, which have a recess G therefor, and they are held by screws H against adjusting-screws I, in such manner as to be adjusted to rise more or less above the surface of the blocks, as required. The springs E may consist of a thin flat plate with a strip of soft India rubber underneath, or they may be constructed in any suitable way to bear against the said blade behind the teeth, when the two blocks are clamped thereon by the screw F, and pinch so as to hold the dresser to the blade as it is shoved along from end to end with the files bearing against the outer corners of the teeth, the said springs being to bear on the blade alike, although it may vary somewhat in thickness. The springs are also provided with adjusting-screws to vary the action, if necessary.

The dresser, being applied as indicated, and moved along the saw from one end to the other, is screwed up a little after each movement, and is moved along the teeth until they are reduced to the requisite width; and thus dresses them all to the same width, which greatly improves the quality of the work done by the saw, and lessens the power required to work it.

Having thus described my invention, I claim as new and desire to secure by Letters Patent—

1. The improved saw-teeth dresser, consisting of the hinged blocks A B, files D, springs E, and the screw F, all combined substantially as specified.

2. The files E, arranged in the blocks, for being adjusted, substantially as specified.

COLLIN M. COWARDIN.

Witnesses:
F. M. GARDNER,
W. L. AYRES.